United States Patent [19]

Trivino Vazquez et al.

[11] Patent Number: 4,919,722

[45] Date of Patent: Apr. 24, 1990

[54] METHOD OF MANUFACTURING A GRANULAR BUILDING MATERIAL FROM REFUSE

[75] Inventors: Fernando Trivino Vazquez, Madrid, Spain; Roger J. Clenin, Puplinge, Switzerland

[73] Assignee: S.A. Societe d'Etudes et d'Applications Industrielles, Geneva, Switzerland

[21] Appl. No.: 139,308

[22] Filed: Dec. 29, 1987

[30] Foreign Application Priority Data

Mar. 19, 1987 [CH] Switzerland .......................... 1046/87

[51] Int. Cl.$^5$ .......................... C04B 7/00; C04B 18/18
[52] U.S. Cl. ........................................ 106/97; 106/407; 241/14; 241/DIG. 38
[58] Field of Search .................. 501/155; 106/97, 407, 106/316; 264/66; 241/DIG. 38, 14, 30

[56] References Cited

U.S. PATENT DOCUMENTS

| | | | |
|---|---|---|---|
| 4,050,871 | 9/1977 | Kleeberg et al. | 264/117 |
| 4,064,212 | 12/1977 | Kleeberg et al. | 264/117 |
| 4,375,986 | 3/1983 | Pichat | 106/97 |
| 4,402,756 | 9/1983 | Prine | 501/155 |
| 4,744,829 | 5/1988 | Eirich et al. | 106/97 |
| 4,780,433 | 10/1988 | Keller, Jr. | 501/82 |
| 4,815,668 | 3/1989 | Frei | 241/DIG. 38 |

*Primary Examiner*—Brian E. Hearn
*Assistant Examiner*—Andrew Griffis
*Attorney, Agent, or Firm*—Cushman, Darby and Cushman

[57] ABSTRACT

A method of manufacturing a granular building material from refuse. Cylindrical granules, having a diameter of 8 mm and a length from 10 to 20 mm, are formed by granulation under a pressure of 600 bar of a homogeneous first powder mixture of 952 kg of crushed household refuse, 50 kg of quicklime and 5 kg of calcium carbonate. The granules are heated at 200° C. for 30 minutes in a rotary tubular kiln so as to obtain 720 kg of granules having a moisture content of about 1% by weight. These granules are finely crushed and, in a malaxator, a second powder mixture is prepared which is composed of a mixture of 101 kg of Portland cement, 101 kg of powdered dolomite, 91 kg of calcium carbonate and 50.5 kg of water, and the fine powder resulting from the crushing of the granules. Finally, the second mixture is granulated under a pressure of 600 bar and the granules are left to harden with the setting of the cement. The final granular building material may be employed as granulate for making concrete.

10 Claims, No Drawings

METHOD OF MANUFACTURING A GRANULAR BUILDING MATERIAL FROM REFUSE

BACKGROUND OF THE INVENTION

The present invention relates to a method of manufacturing a granular building material from refuse.

As is well known, it has become increasingly difficult to solve the problems posed by the necessity of eliminate a constantly increasing amount of refuse and various residues, and thereby also eliminate the risks of pollution and other nuisances.

With the aim of providing an acceptable solution to these problems, it has been proposed to transform refuse, which has been crushed and rid of metallic constituents without a special sorting operation, into solid bodies of various shapes and dimensions which may be employed as building material.

Thus, for example, French Patent No. 2,098,777 describes the manufacture of hard, compact blocks capable of being employed as building or filling material. A metallic silicate is incorporated into a mass of crushed, unsorted refuse. The mass so treated is compacted into blocks under high pressure in a press. The blocks are finally hardened, either at ambient temperature, or by heating, for example, at a temperature from 80° to 200° C.

French Patent No. 2,337,588 describes a method of eliminating household refuse. The method comprises incorporating into a fine, crushed refuse powder rid of metallic bodies, a binder chosen from silicates, various synthetic resins, pitches and lime. Also added are a plasticizer such as powdered cellulose and a substance such as the chloride of sodium, calcium or magnesium, termed the "suitable catalyst for the plasticizer", as well as a mineral filler such as calcium carbonate, quicklime, coal ash, blast furnace flyash, etc. The resultant mixture is subjected to granulation under a high pressure, for example, 50 to 900 bar, so as to form solid granules which may be employed as artificial gravel. This patent mentions that, in order to accelerate the hardening of these granules, they may possibly be heated to a temperature not exceeding 200° C.

French patent application No. 2,472,421 ('421) describes a method of transforming household refuse into artificial gravel. In accordance with the disclosed method, a mass of crushed refuse, rid of metallic bodies, containing at least 30% by weight cellulose, and having a moisture content from 20 to 45% by weight, is caused to react with quicklime and/or a salt of calcium at a temperature lying between 250° and 450° C. The powdery product thus obtained is then agglomerated by compression after the addition of a binder, in order to form granules.

The '421 application likewise describes a variant upon this method in which the granules are subjected to a final heat treatment at a temperature lying between 150° and 350° C. for a length of time sufficient to cause heating at the core.

The '421 application describes a binder for the method which is an aqueous composition containing a mixture of a number of mineral and organic substances including monocalcium phosphate, sulphate of lime, urea, casein, bone glue and polyvinyl acetate as well as cotton fibres and whiting.

On the other hand, the '421 application indicates that various fillers, such as industrial waste, resins and silicates, may be incorporated into the refuse either before crushing it or before agglomeration.

The methods in accordance with the prior art, especially those which are described in the above-mentioned patent documents are not entirely satisfactory, especially because solid bodies are not obtained exhibiting both good mechanical properties and high chemical and biological inertness as well as practically zero solubility in water, as would be desirable for a granular building material.

An aim of the present invention is precisely to provide a method for obtaining granules exhibiting an optimum combination of mechanical and physico-chemical properties particularly well suited for employment as building material, especially as granulate for the preparation of concrete.

SUMMARY OF THE INVENTION

In accordance with the above objects, there has been provided a novel method of manufacturing a granular building material from refuse.

The first step in the method according to the present invention is providing a crushed refuse material substantially free of metallic constituents. The refuse material is then mixed with a mineral material containing calcium oxide in the free or combined state, whereby a first homogeneous powder mixture is formed. The first powder mixture is granulated under pressure, thereby producing first granules. The first granules are heated to between about 130° and 230° C. for a length of time sufficient to reduce the water content to between about 0.1 and 1% by weight. The first granules are then crushed to form a granule powder. The granule powder is mixed with hydraulic cement and a quantity of water sufficient to set the cement, whereby a second powder mixture is produced. The second mixture is then granulated under pressure. Finally, the hydraulic cement is allowed to set, whereby second granules of a granular building material are produced.

The mineral material is preferably selected from lime, fly-ash, calcite, dolomite and argillaceous matter.

The first powder mixture preferably comprises from 90–95% by weight crushed refuse material and from 5–10% by weight mineral material.

According to a preferred embodiment, the first powder mixture additionally comprises a second mineral material comprising calcium and magnesium carbonate in the free or combined state.

The second powder mixture further comprises a third mineral material which is not very soluble in water and does not impede the setting of the cement. The third mineral material is preferably selected from lime, calcium carbonate, calcite, dolomite, magnesite and argillaceous matter.

In a further preferred embodiment, the second powder mixture further comprises sodium silicate as an additional binder.

Further objects, features and advantages of the present invention will become apparent from the Description of Preferred Embodiments which follows, when considered together with the illustrative examples.

DESCRIPTION OF PREFERRED EMBODIMENTS

The method of the present invention is characterized in that crushed refuse free from metallic constituents is mixed homogeneously with at least one powdered, mineral material containing calcium oxide in the free or combined state. The mixture thus obtained is granulated under pressure and the granules so formed are subjected to heat treatment at a temperature lying between 130° and 230° C. for a length of time such that their water content is reduced to a value from about 0.1 to 1% by weight. The granules are thereafter finely crushed and the powder thus obtained is mixed with hydraulic cement and a suitable quantity of water for setting the cement. This homogeneous powdery mixture is granulated under pressure, and, finally, the granules are left to harden with the setting of the cement.

The method in accordance with the invention is founded upon the combination of (1) a heat treatment of first granules, obtained by granulating under pressure a homogeneous mixture of crushed refuse and mineral matter containing calcium oxide, and (2) granulation under pressure of the powder resulting from the crushing of the first granules after their heat treatment. Hydraulic cement is employed as binder in order to confer a high mechanical strength upon the granules finally obtained.

It has been surprisingly found that this new combination of operations enables granules to be obtained which exhibit a high mechanical strength, high chemical and biological inertness, and practically zero solubility in water. The granules produced may therefore be employed as building material without risk of pollution and other nuisances.

The mineral material containing calcium oxide in the free or combined state may be chosen from, for example, lime, flyash, calcite, dolomite and argillaceous matter.

The proportions of the mixture of crushed refuse and mineral matter containing calcium oxide are advantageously from about 90 to 95% by weight refuse, and about 5 to 10% by weight mineral material.

One may additionally incorporate into the mixture of crushed refuse and mineral material containing calcium oxide, at least one second, mineral material containing calcium and magnesium carbonate in the free or combined state, for example, dolomite.

One may also optionally incorporate at least one third, powdered, mineral material which is not very soluble in water and does not impede the setting of the cement, into the powder mixture resulting from the crushed first granules, hydraulic cement and water. This third mineral material may be chosen, for example, from lime, calcium carbonate, calcite, dolomite, flyash, magnesite and argillaceous matter.

The proportion of hydraulic cement in the final mixture is advantageously from 5 to 25% by weight cement with respect to the powder obtained by crushing the first granules.

The hydraulic cement employed is advantageously one with a compressive strength ($\beta_{w28}$) of 45N/mm$^2$ (6,428 psi) as measured on a cubic sample having a volume of one cubic decimeter, after a hardening time of 28 days.

One may also optionally employ, in addition to the hydraulic cement, at least one additional binder, for example, sodium silicate.

The moisture content in the final mixture is advantageously regulated to a value on the order of 5 to 6% by weight. This is preferably regulated by suitably proportioning the quantity of water incorporated into the final mixture.

The ratio by weight of water to cement in the final mixture is advantageously on the order of 0.5 to 0.6.

The different operations required for practicing the method in accordance with the invention may be carried out in any suitable manner, particularly by employing the known techniques and conventional apparatae for the treatment of refuse.

In particular, in order to obtain refuse containing practically no metallic constituents, one may employ refuse which proceeds from removal to the collecting points and is subjected to the usual operations of sorting and screening in order to separate from it objects which are possibly recoverable and/or recyclable, particularly metallic masses of large dimensions.

Thereafter, the refuse may be converted to a homogeneous powdery mixture practically free from metallic constituents, particularly iron. To achieve this homogeneous mixture, the refuse may be subjected to operations of crushing and mixing carried out simultaneously or separately, possibly combined with one or more sorting operations intended to separate metallic scraps, more particularly iron-based scraps. For example, sorted refuse may be subjected to a first coarse crushing, down to an average scrap size of about 50 millimeters. This crushing is carried out before or after a magnetic sorting intended to remove particles of iron and other ferromagnetic matter. The first crushing is followed by a second crushing carried out, for example, by means of a rotary hammer crusher or a chipper so as to reduce the refuse into particles (in the form of granules and fibres) having maximum dimensions less than 10 to 20 millimeters.

The step of mixing the mass of crushed refuse with the mineral material containing calcium oxide may likewise be carried out by any suitable technique and apparatus, in particular by means of automatic proportioner and mixer devices which operate intermittently or continuously.

To prepare granules from the mixture of crushed refuse and mineral material containing calcium oxide one may advantageously employ a rotary granulator apparatus having rollers and a die. An example of such an apparatus is one of the type employed for the production of granular food for cattle, which enables tablets to be obtained having the shape of cylindrical bodies with, for example, a length from 6 to 30 millimeters and a diameter from 2 to 20 millimeters, by granulation under a pressure of the order of 150 to 900 bar.

The heat treatment of the granules may advantageously be carried out by passing them in the axial direction through a rotary tubular kiln. The kiln is arranged with a practically horizontal axis of rotation or one slightly sloping in the direction of the progression of material inside the kiln. The kiln is equipped with a spiral inner wall which ensures the circulation of the granules. The duration of heating suitable for obtaining the required water content between 0.1 and 1% by weight is, for example, on the order of 30 minutes.

EXAMPLE 1:

A first homogeneous mixture is prepared from 952 kg of crushed household refuse having a moisture content on the order of 30% by weight (resulting from the removal of 48 kg of scrap iron from a mass of 1,000 kg of household refuse proceeding directly from collection), 50 kg of quicklime and 5 kg of calcium carbonate.

This mixture is granulated under a pressure of 600 bar by means of a rotary granulator having rollers and a die so as to form cylindrical granules having a diameter of 8mm and a variable length lying between about 10 and 20 mm.

These granules are subjected to a heat treatment at 200° C. for 30 minutes in a rotary tubular kiln having a horizontal axis.

720 kg of granules are thus obtained, having a moisture content slightly less than 1% by weight.

These granules are reduced to fine powder by means of a hammer crusher. By means of a cement-type mixer, a homogeneous mixture is then prepared from 101 kg of Portland cement, 101 kg of powdered dolomite, 91 kg of powdered industrial calcium carbonate and 50.5 kg of water. Finally, the final mixture is prepared in a malaxator. The final mixture is a mixture of cement, dolomite, calcium carbonate and water obtained as described above, and the fine powder resulting from the crushing of the granules. Immediately after the formation of this final mixture the whole powdery mass thus obtained is granulated under a pressure of 600 bar by means of a rotary granulator having rollers and a die. The granulator is similar to that which is employed for carrying out the granulation of the first mixture, and likewise, forms cylindrical granules having a diameter of 8 mm and a length between 10 and 20 mm.

Thus, about 1,050 kg of granules are obtained which start to harden by the heat generated as a consequence of the setting of the cement.

After cooling down to ambient temperature the granules have a moisture content on the order of 4 to 4.5% by weight.

EXAMPLE 2:

One proceeds in the same manner as in Example 1, except that the first mixture is prepared from 939 kg of crushed household refuse having a moisture content of 25% by weight (resulting from the removal of 61 kg of scrap iron from a mass of 1,000 kg of household refuse proceeding from the collection), 100 kg of quicklime and 50 kg of calcium carbonate. The first mixture is granulated as in Example 1.

The final mixture is prepared from 864 kg of crushed granule powder having a moisture content slightly less than 1%, 84 kg of Portland cement, 84 kg of powdered dolomite, 84 kg of calcium carbonate and 42 kg of water. This mixture has a moisture content of about 5% by weight.

One finally obtains 1,157 kg of granules.

EXAMPLE 3:

One proceeds as in Example 1 and 2, employing the following ingredients for the preparation of the two mixtures:

| First mixture | | |
|---|---|---|
| 947 | kg | of household refuse at 20% moisture by weight; |
| 50 | kg | of quicklime; and |
| 50 | kg | of dolomite powder. |
| Final mixture | | |
| 857 | kg | of powder obtained by crushing the granules formed from the first mixture; |
| 212 | kg | of Portland cement; |
| 212 | kg | of dolomite; |
| 127 | kg | of $CaCO_3$; |
| 41 | kg | of sodium silicate; |
| 61 | kg | of water. |

The moisture content of the final mixture is 7% by weight. One finally obtains 1,500 kg of granules.

What is claimed is:

1. A method of manufacturing a granular building material being from refuse comprising the steps of:
   (a) providing a crushed refuse material substantially free of metallic constituents and containing water;
   (b) mixing the refuse material with a mineral material containing calcium oxide in the free or combined state, whereby a first homogeneous powder mixture is formed;
   (c) granulating the first powder mixture under pressure;
   (d) heating the first granules to between about 130° and 230° C. for a length of time sufficient to reduce their water content to between about 0.1 and 1% by weight;
   (e) crushing the first granules to form a granule powder;
   (f) mixing the granule powder with hydraulic cement and a quantity of water sufficient to set the cement, whereby a second powder mixture is produced;
   (g) granulating the second mixture under pressure; and
   (h) allowing the hydraulic cement to set, whereby second granules of a granular building material are produced.

2. A method according to claim 1, wherein said mineral material is selected from lime, fly-ash, calcite, dolomite and argillaceous matter.

3. A method according to claim 1, where said first powder mixture comprises from 90–95% by weight crushed refuse material and from 5–10% by weight mineral material.

4. A method according to claim 1, wherein said first powder mixture additionally comprises a second mineral material comprising calcium and magnesium carbonate in the free or combined state.

5. A method according to claim 4, wherein said second mineral material is dolomite.

6. A method according to claim 4, wherein said second powder mixture further comprises a third mineral material which is substantially insoluble in water.

7. A method according to claim 1, wherein the hydraulic cement in said second powder mixture is 5–25% by weight of said granule powder.

8. A method according to claim 7, wherein said second powder mixture contains water in a weight ratio to cement of from about 0.5 to 0.6.

9. A method according to claim 1, wherein said second powder mixture comprises an additional binder.

10. A method according to claim 9, wherein said additional binder is sodium silicate.

* * * * *